Aug. 26, 1941.  L. W. GODDU  2,253,954
LENS BLOCKING DEVICE
Filed March 27, 1939  5 Sheets-Sheet 3
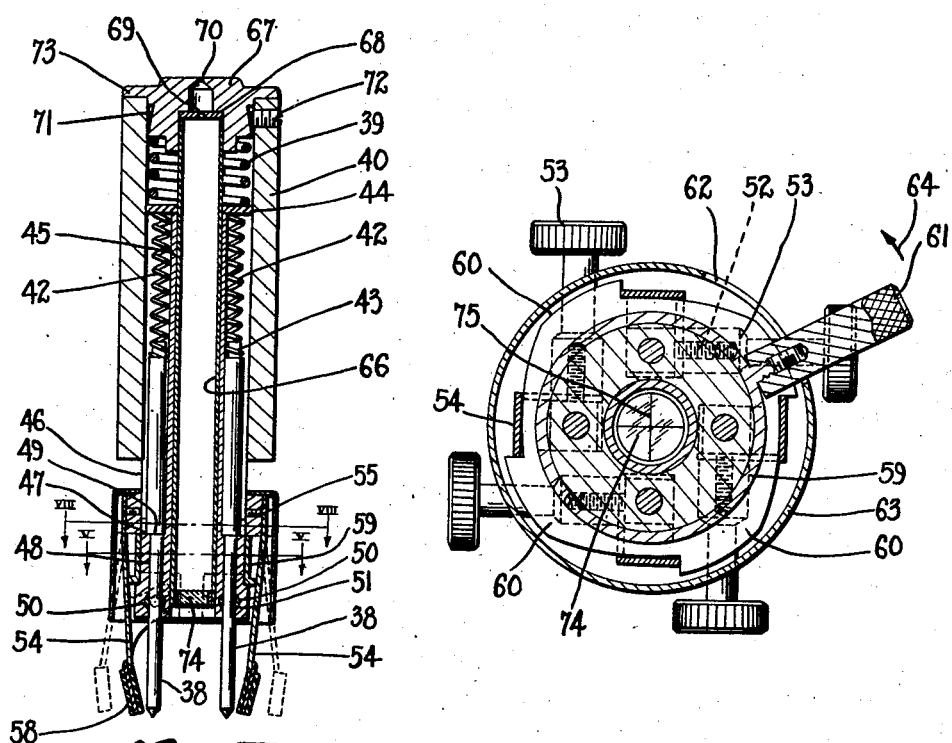
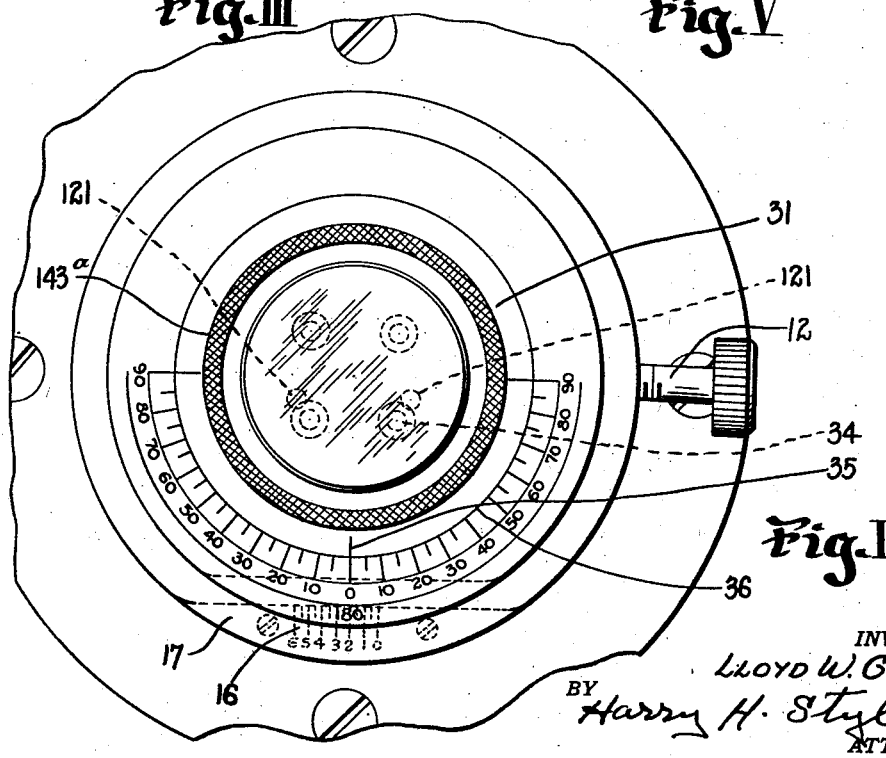
INVENTOR.
LLOYD W. GODDU
BY Harry H. Styll
ATTORNEY.

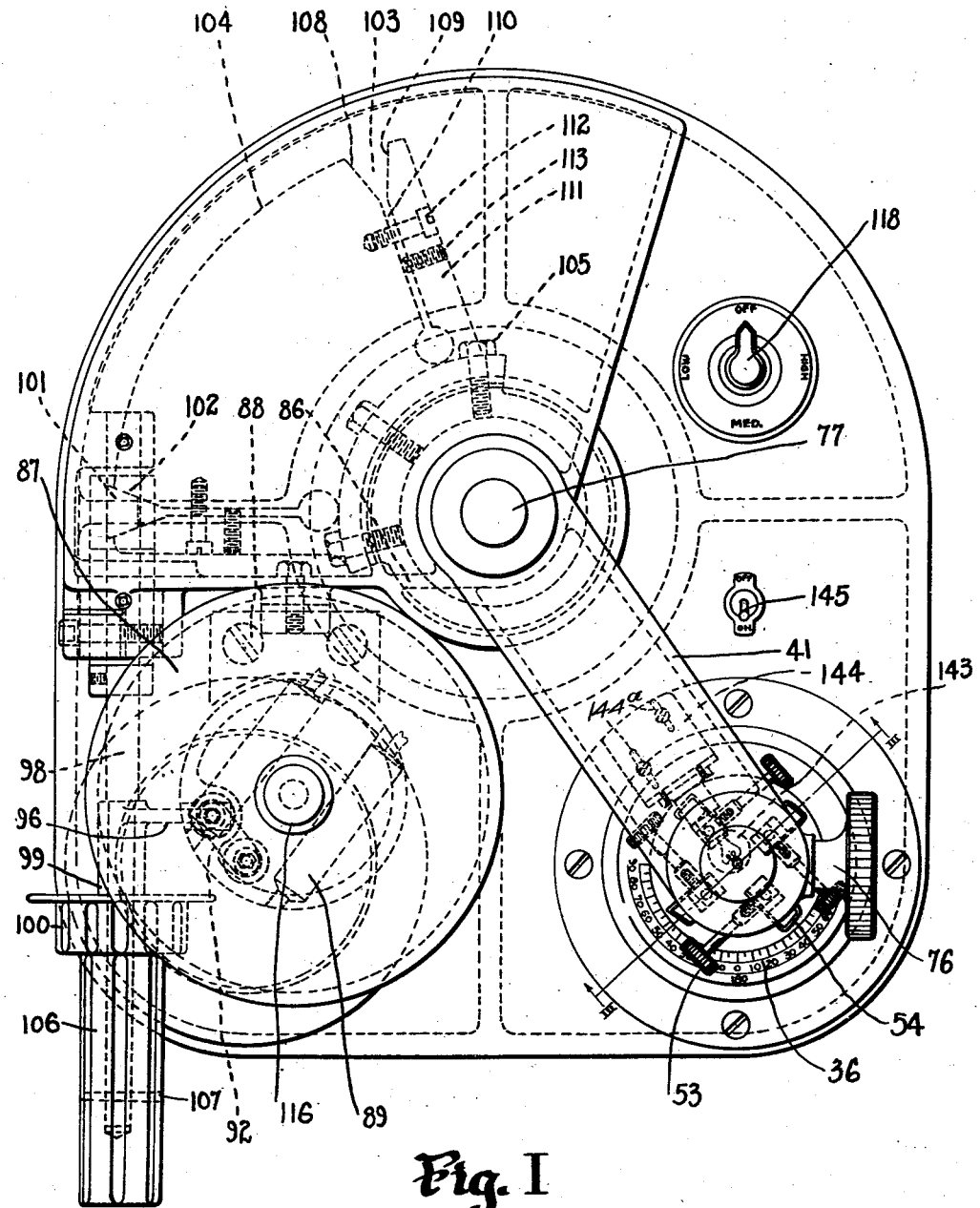
Fig. I

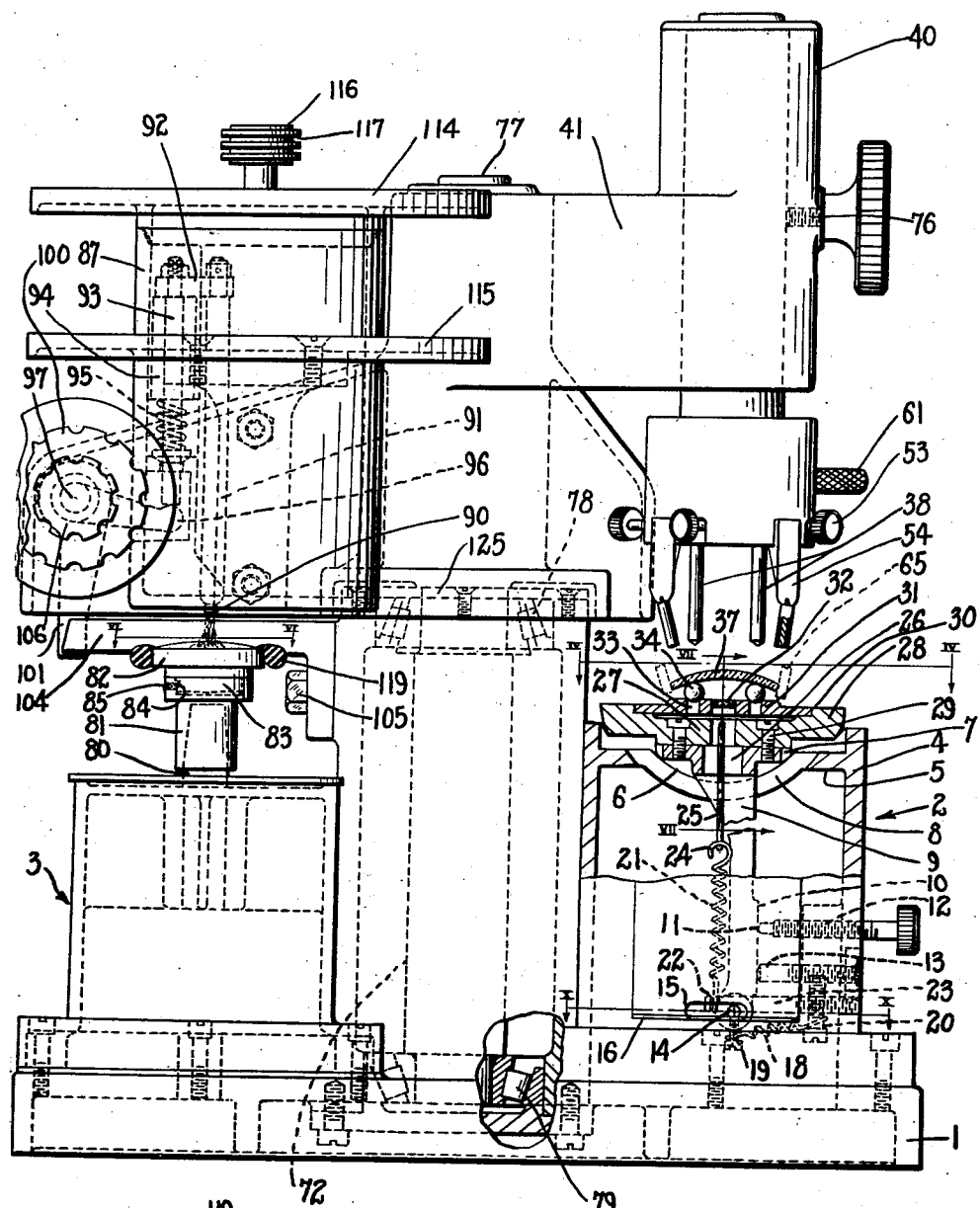
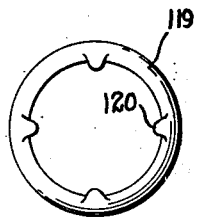
Fig. II
Fig. VI
INVENTOR.
LLOYD W. GODDU
BY Harry H. Styll
ATTORNEY.

Aug. 26, 1941.   L. W. GODDU   2,253,954
LENS BLOCKING DEVICE
Filed March 27, 1939   5 Sheets-Sheet 4
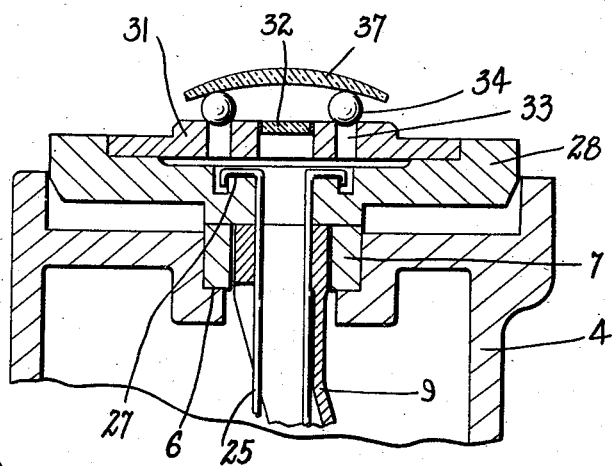
Fig. VII
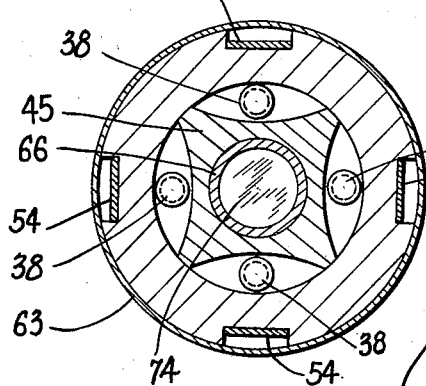
Fig. VIII
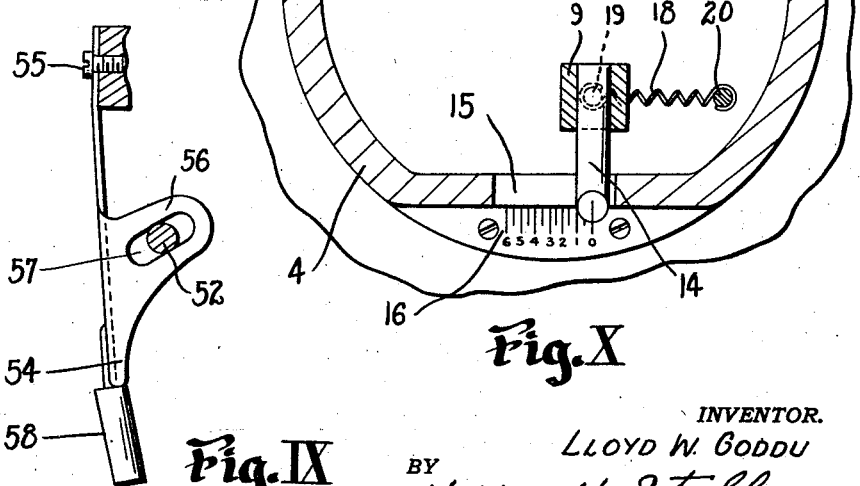
Fig. IX   Fig. X
INVENTOR.
LLOYD W. GODDU
BY Harry H. Styll
ATTORNEY.

Aug. 26, 1941.   L. W. GODDU   2,253,954
LENS BLOCKING DEVICE
Filed March 27, 1939   5 Sheets—Sheet 5
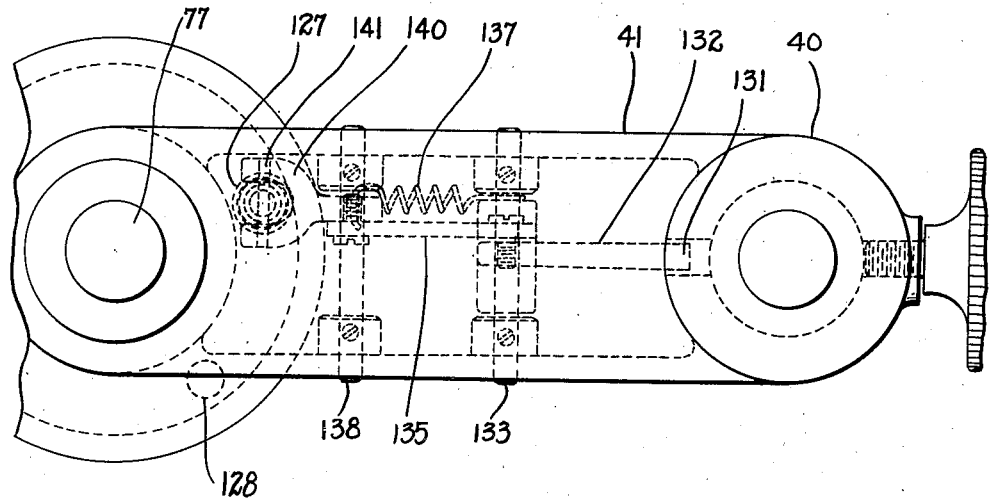
Fig. XI
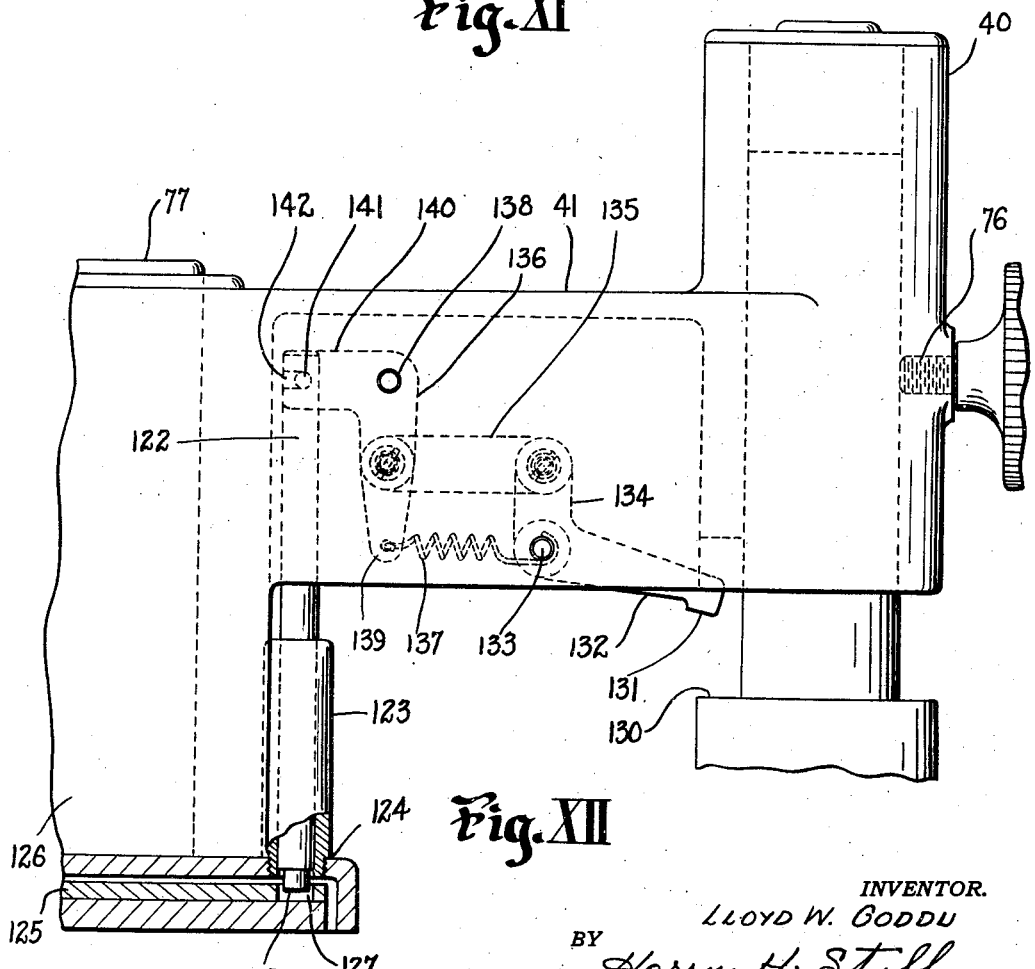
Fig. XII
INVENTOR.
LLOYD W. GODDU
BY Harry H. Styll
ATTORNEY.

Patented Aug. 26, 1941

2,253,954

UNITED STATES PATENT OFFICE 2,253,954

LENS BLOCKING DEVICE

Lloyd W. Goddu, Southbridge, Mass., assignor to American Optical Company, Southbridge, Mass., a voluntary association of Massachusetts Application March 27, 1939, Serial No. 264,330

9 Claims. (Cl. 51—277)

This invention relates to improvements in blocking devices and has particular reference to improved means and method of blocking lenses.

One of the principal objects of the invention is to provide improved means and method of blocking semi-finished lens blanks whereby the positional factors of the finished prescriptive power, which the lens is to possess, may be located prior to the blocking and the said blank blocked while held in said located position.

Another object of the invention is to provide improved means and method of blocking lenses whereby the prism and cylinder axes and extent of said prism, in addition to the optical center of the finished lens, may be located prior to blocking the semi-finished lens blank and the said blank blocked while held in said position.

Another object is to provide novel sighting and gripping means for semi-finished lens blanks whereby the optical characteristics, which the finished lens is to possess, may be predetermined and the said blank held by said gripping means to retain its position whereby it may be transferred into alignment with and be secured to a lens block while held in said position.

Another object is to provide a novel method of blocking semi-finished lens blanks whereby the positional elements of the prescriptive characteristics of the lens, which is to be formed by said blank may be predetermined and the said semi-finished blank may be conveyed into alignment with and secured to a lens block while said additional elements are retained.

Another object is to provide novel means and method whereby pitch may be applied and confined to the effective holding surface of the block.

Another object is to provide novel means and method of gripping and maintaining the semi-finished blank after it has been located in desired position.

Another object is to provide a novel arrangement whereby the lens and lens block may be heated prior to the aligning and securing of the lens to the block.

Another object is to provide novel means and method of heating and depositing a given amount of pitch on the lens block.

Another object is to provide a device having an upright for supporting a lens blank and an upright for supporting a lens block in combination with a swingable head having sighting and gripping means movable into and out of alignment with the respective uprights.

Another object is to provide a holding member having combined backing and edge supporting means for holding and conveying said lens blank from positional locating means into alignment with a lens block for securing said lens blank to said block while held in said located position.

Other objects and advantages of the invention will become apparent from the following description taken in connection with the accompanying drawings and it will be apparent that many changes may be made in the details of construction and arrangement of parts and methods shown and described without departing from the spirit of the invention as expressed in the accompanying claims. I, therefore, do not wish to be limited to the exact details of construction and arrangement of parts and methods shown and described as the preferred form only has been given by way of illustration.

Referring to the drawings:

Fig. I is a plan view of the device embodying the invention;

Fig. II is a front elevation of said device;

Fig. III is a longitudinal sectional view taken on line III—III of the sighting and gripping means of Fig. I;

Fig. IV is a plan view of the upright support for the lens blank showing the axis and prism locating scale of Fig. II;

Fig. V is an enlarged sectional view taken on line V—V of Fig. III and looking in the direction indicated by the arrows;

Fig. VI is a plan view of a resilient ring used in confining the pitch to the effective retaining surface of the block;

Fig. VII is an enlarged sectional view taken on line VII—VII of Fig. II, looking in the direction of the arrows;

Fig. VIII is an enlarged sectional view taken on line VIII—VIII of Fig. III, looking in the direction of the arrows;

Fig. IX is an enlarged view of one of the lens contact members;

Fig. X is an enlarged cross section taken on line X—X of Fig. II, looking in the direction of the arrows;

Fig. XI is a plan view of an alternate construction of the swinging arm as shown in Figs. I and II; and Fig. XII is a front elevation of the alternate construction shown in Fig. XI.

When blocking lenses for the forming of the final prescriptive surface on said lenses it is of extreme importance that the said lens be located in proper axial position and, in instances wherein the said lens is to have a cylinder and prismatic correction embodied therein, it is also of extreme importance that the axis of the cylinder and prism components of the lens be located in proper meridianal relation with each other.

The prime object, therefore, of the present invention is to provide improved means and method whereby all of the prescriptive components may be accurately determined prior to the final securing of the lens to the lens block so that the said blank will be held in proper position in the abrading machine and the desired prescriptive components will be embodied therein during the forming of the final prescriptive surface on said blank.

The unique feature of the present device and method is that it eliminates all guesswork, which was inherent with most prior art devices and methods of blocking lenses, and insures that the accurate optical characteristics are being introduced during the final abrading of the prescriptive surface on the blank.

Referring more particularly to the drawings wherein like characters of reference designate like parts throughout the views, the device embodying the invention comprises a base 1 having spaced uprights 2 and 3 thereon. The said upright 2 comprises a hollow support 4 having a web 5 in the upper portion thereof provided with a curved seat 6 on which an engagement member 7 is rested and is adapted to be located at different angular positions about the center of curvature of the seat 6. It is to be noted that the center of curvature of the seat 6 lies substantially on the longitudinal axis of the upright 2.

The curved seat 6 is slotted, as illustrated at 8, and is adapted to provide a clearance through which a depending member 9 on the engagement member 7 extends. The depending member 9 is provided with a contact face 10 which is adapted to be engaged by the end 11 of an adjustable screw member 12. The screw member 12 is threaded into a suitable opening formed in the side of the hollow support 4. A suitable stop 13 is provided for limiting the movement of the depending member 9 in a direction toward the screw member 12. The lower end of the depending member 9 is provided with a pointer 14 which extends through a slot 15 in the lower portion of the housing 4. The said pointer 14 moves over a suitable graduated scale 16 on the adjacent face 17 of the base. A suitable spring 18 having one end secured to a screw 19 carried by the pointer 14 and the other end secured to a screw 20 carried by the hollow support 4 is adapted to constantly urge the depending member 9 toward the screw member 12 and to maintain the said face 10 in constant engagement with the end 11 of the screw 12. The engagement member 7 is constantly maintained in contact with the curved seat 6 by resilient means 21 secured at 22 to a pin-like member 23 internally of and carried by the support 4 and secured at its opposite end 24 to a link member 25 which extends through an opening 26 centrally of the engagement member 7 and which has deflecting end portions 27 which overlie the opposed adjacent upper surface of said engagement member 7.

A plate 28 is secured to the engagement member 7 by means of screws or the like 29. The said plate member 28 has a shouldered recess 30 in the upper face thereof in which is mounted a rotatable disc 31. Said disc 31 has a central opening in which is mounted a translucent member 32. The said disc 31 also has a plurality of openings 33 therein in which a plurality of ball members 34 are supported. The disc 31, as shown in Fig. IV, is provided with a location line 35 which cooperatively functions with a degree scale 36. The amount of prism which is to be introduced in the lens is then determined by adjusting the screw 12 inwardly or outwardly and noting the position of the indicator 14 relative to the scale 16. For example, if it is desired to introduce 3 prism diopters the indicator 14 is moved into alignment with the graduation 3 of the scale 16. The indication line 35 and degree scale 36 are used primarily in instances where the finished lens is to have a cylinder axis and a prism axis which are not coincident with each other. For example, if the prism axis as called for in the prescription is 30° away from the cylinder axis, the cylinder axis is lined up with the 90°–90° line of the scale. The disc 31, including the ball members 34 on which the semifinished blank 37 is rotated, is then rotated by means of the raised knurl portion 143a to bring the location line 35 into alignment with the 30° line of the protractor scale and thereby simultaneously moves the axis of the prism in desired relation with the 90°–90° line of the protractor scale. Even though the axis lines have been previously marked on the blank following the usual procedure in the manufacture of ophthalmic lenses, this aligning obviates any errors which might have been introduced during the said marking. In this manner the axis of the prism and cylinder may be positively located and the extent of prism may be introduced. It is to be understood that after the lens blank has been positioned as stated above a plurality of contact members 38 are moved down into engagement with the upper surface of the blank 37. The contact members 38, as shown in Fig. III, are constantly urged as a unit toward the blank 37 by means of a coil spring 39 internally of a housing 40 carried by the bracket 41. Each of the contact members 38 are independently urged toward the blank 37 by means of a plurality of backing springs 42 which engage each of the contact members 38 at one end thereof, as illustrated at 43, and, at their opposite end, engage a washer 44. The washer 44 is urged downwardly of the housing 40 by the spring 39 and, in turn, engages the upper end of a sleeve 45 which is slidably mounted in the housing 40. The sleeve 45 is provided with a plurality of longitudinal grooves 46 as shown in Fig. III. The contact members 38 and backing springs 42 are positioned within these grooves with sufficient clearance so that the sleeve 45 is free to reciprocate in the housing 40. The longitudinal grooves 46 terminate in a shouldered edge 47 and communicate with a plurality of openings 48 in which a reduced portion of the contact members 38 are slidably mounted. The members 38 are each provided with a shouldered portion 49 which is adapted to engage the shoulder edge 47 and limit the downward movement of said members 38 under the reaction of the resilient means 42. The lower end of the sleeve 45 is provided with a plurality of transversely extending openings 50 directly intersecting the openings 48 in which the reduced portions of the contact members 38 are slidably mounted. In each of said openings 50 there is provided a binding member 51. These binding members 51 are formed with openings aligned with the longitudinal openings 48 and the reduced portion of the contact members 38 is adapted to extend through the openings of said binding members 51. Each of said binding members 51 has a threaded extension on which is threadedly connected a manually operable binding member 53. The binding members 51 lock the contact members 38 against longitudinal movement in the openings 48 by a shearing action introduced by threading the binding members 53 on to the thread portion 52 thereof. This causes the binding members 51 to be urged sidewise and introduce a locking action. The thread members 52 also provide a connection with a plurality of spring fingers 54. The spring fingers 54 are rigidly attached adjacent the upper ends thereof to an enlargement on the sleeve 45 by means of screws or the like 55. Each of said fingers is provided with an angled tongue 56 and has a slot 57 therein through which the threaded portions 52 extend. See Fig. IX. The tongues 56 lie between the clamp nuts 53 and the binding members 51, so that when the clamp nuts 53 are tightened to draw the binding members 51 outwardly, they simultaneously pinch the tongue 56 of the respective spring fingers 54 to hold said fingers 54 in adjusted position. It is apparent that as the clamp nuts 53 are loosened, the spring fingers 54 will be free to swing inwardly or outwardly through the inherent resiliency thereof about their points of attachment 55. Each of the spring fingers 54 is provided with a Neoprene tubing 58 or other cushioning means at the gripping ends thereof. The sleeve 45 has a circumferential groove therein on which a cam 59 is rotatably supported. Said cam member 59 is provided with a plurality of risers 60 cooperatively functioning with each of the spring fingers 54. See Fig. V. The cam member 59 is provided with a handle 61 which protrudes outwardly of a slot 62 in a housing 63 which surrounds the assembly. When the handle 61 is moved in a direction indicated by the arrow 64, the spring fingers 54 are each engaged by a riser 60 and are moved in an outward direction. It is to be understood that the clamp nuts 53 have been loosened. The spring fingers 54 have an initial set which constantly urges them into engagement with the cam 59, so that when the handle 61 is moved in a direction opposite that indicated by the arrow 64 they will move toward each other through their tendency to return to their initial set. This inward movement of the spring fingers 54 causes them to move into engagement with the edge of the lens blank as illustrated by the dotted lines at 65 in Fig. II, gripping the said blank through the inherent resiliency thereof. The said fingers 54 are held in gripping relation with the edge of the blank by tightening the clamp nuts 53. It is to be noted that these spring fingers function separately of each other, so that a lens having an irregular contour shape may be gripped equally as well as a lens having a symmetrical contour shape.

The sleeve 45 is provided, as shown in Fig. III, with a hollow bore in which is extended a sighting tube 66. This tube is secured to a cap member 67 and has a washer 68 located adjacent the upper end thereof, and provided with a restricted opening 69. The cap member 67 is similarly provided with a restricted opening 70 in axial alignment with the opening 69. The cap member 67 also provides means for retaining the spring 39 in position. The said cap member 67 has a tapered portion 71 extending within the housing 40. A plurality of binding screws 72 are adapted to engage the tapered side surface of the portion 71 internally of the housing 40, and the taper is such that a tightening of the set screws 72 automatically cams the cap member 67 in a direction inwardly of the housing and forces the flanged portion 73 of said cap member 67 into binding relation with the upper edge surface of the housing 40. The lower end of the sighting tube 66 is provided with a transparent member 74. This transparent member 74 is in the form of a disc having cross-hairs 75 thereon. These cross-hairs 75 may be adjusted to an initial meridianal position by loosening the set screws 72 and rotating the cap 67. The sight tube 66 is smaller in diameter than the bore of the sleeve 45 by an amount sufficient to permit the member 74 to be adjusted sidewise a slight amount in any meridian desired so as to position the point of intersection of the cross-hairs 75 in axial position.

The complete assemblage, including the sleeve 45, contact members 38, spring fingers, etc., is slidingly supported in the housing 40 and is constantly urged toward the lens support by the resilient means 39. The sleeve 45 is locked in adjusted position by means of a clamp screw 76. In use the handle 61 is initially moved in a direction indicated by the arrow 64 to spread the spring fingers 54 outwardly. The clamp screw 76 is then loosened and the contact members 38 are manually guided into contact with the lens blank positioned on the ball members 34. The said blank is manually supported in desired aligned position on the ball members during this operation. The spring fingers 54 are now located so that they may be allowed to grip the contour edge of the lens blank. This is accompanied by moving the handle 61 in a direction opposite that indicated by the arrow 64. This allows the spring fingers to resiliently engage the edge of the lens with the contact members 38 engaging the upper surface of said lens. A final check is then made by sighting through the sight tube 66 to insure that the lens blank has not moved from its desired prelocated position. The clamp nuts 53 are then tightened to simultaneously secure the spring fingers in gripping relation with the edge of the lens blank and to secure the contact members 38 against longitudinal movement. It is to be noted that the gripping ends of the fingers 54 are angled inwardly so as to insure a positive grip with the edge of the lens. The housing 40 is connected to the bracket 41 rotatably supported on a stud 77. Stud 77 is supported in spaced roller bearings 78 and 79. This arrangement allows the mechanism which grips and holds the lens blank to be swung sidewise into alignment with the upright 3.

The upright 3 has a tapered support 80 thereon on which is fitted the adapter 81, holding the lens block 82. The adapter 81 has a recessed end in which is extended a shank 83 on the block 82. The shank 83 has a circumferential taper 84 which is adapted to be engaged by a plurality of set screws 85. The taper 84 is such that the binding action of the set screws 85 moves the block 82 in a direction inwardly of the recess. The bracket 41 has an extension 86 to which is secured a pitch kettle 87. The kettle 87 is secured to the extension by means of the screws or the like 88. The kettle 87 has heating units 89 internally thereof. These heating units 89 may be in the form of electrical coils or the like and are preferably positioned internally of the kettle 87. The kettle 87 is provided with an outlet opening 90 in the bottom thereof, normally in alignment with the block 82 directly above said block 82. Internally of the kettle 87 there is supported a valve stem 91 which is movable toward and away from the opening 90 and provides stopper means for said opening 90. The valve stem 91 is connected adjacent its upper end to a link member 92, which in turn is connected with a plunger 93. The plunger 93 is slidably supported in a bearing 94 and is normally urged in a downward direction by a coil spring 95. The lower end of the plunger 93 is engaged by a lever 96 pivotally supported at 97 on a shaft 98. See Figs. I and II. The lever 96 has a sleeve-like portion 99 rotatably supported on the shaft 98 for rotary movement independently of said shaft. The sleeve 99 is connected with a knurled handwheel 100 whereby the said lever may be operated externally of the kettle 87. A latch member 101 is secured adjacent the rear end of the shaft 98 and is adapted to be moved into and out of blocking engagement with locating slots 102 and 103, formed in a flange 104 carried by the base 1. The flange 104 is secured to the base 1 by bolts or the like 105. See Fig. II. The forward end of the shaft 98 is provided with a handle grip 106 which is keyed thereto by a pin member or the like 107. The locating slots 102 and 103 are so positioned that when the latch member 101 is in engagement with the slot 102, the aligning and gripping means is in desired alignment with the lens blank supporting portion of the device and the discharge opening 90 is directly above the lens block 82. When the latch member 101 is in the slot 103 the lens blank holding and gripping means constituting the spring pressed contacts 38 and fingers 54 are in axial alignment with the lens block 82. This is accomplished by rotating the hand grip 106 in amounts sufficient to move the latch member 101 outwardly of the slot 102 and then swinging the head of the device sidewise until the latch member is aligned and engaged in the slot 103. The locating slots 102 and 103 are respectively provided with tapered side surfaces 108 and 109 on divided portions of the flange 104. This division is accompanied by forming a slot 110 inwardly of the flange a given amount, so as to produce an effective spring finger 111 which may be moved toward the contiguous portion of the flange 104 by means of a screw or the like 112 and may be moved away from said contiguous portion by means of a set screw or the like 113. The pitch kettle 87 is provided with spaced shelves 114 and 115 on which the lens blocks 82 and blanks 37 may be placed for preheating. The shelf 114 also provides a cover for the kettle 87 and has an air cooled knob 116 which may be gripped to lift the cover from the kettle. This air cooling is the result of having a plurality of circumferential slots 117 formed in the knob.

In use pitch is placed in the kettle 87 and is heated to a molten state by means of the heating units 89. The heating units may be energized or de-energized by means of a switch 118 which may be set at different positions for low, medium, and high temperature.

A resilient rig 119 of material such as Neoprene or the like, which is resistant to oil and pitch, and having a plurality of integral tongues 120 thereon is placed around the contour of the block 82 adjacent the effective holding surface of the block and provides a circumferential ring-like means for retaining the molten pitch on the effective attaching surface of the block 82. The tongues 120 relatively intimately engage the upper surface of the block so that the molten pitch will flow around them and provide clearance points whereby the lens may be gauged on the blocking during subsequent operations.

In operation the blank 37 to be blocked is first located in desired position on the ball members 34 as previously stated above. The contact members 38 are then moved down into engagement with the upper surface of the blank 37 and the fingers 54 are likewise moved into gripping relation with the edge of the blank 37. The clamp screws 53 are then tightened to secure the contact members 38 and fingers 54 in intimate relation, insuring the positive supporting of said lens blank 37. The lens blank 37 and associated mechanism is then raised clear of the supporting table by loosening the clamp screw 76 and sliding the sleeve 45 upwardly in the housing 40. The clamp screw 76 is then tightened to hold the position. The knurled handwheel 100 is then rotated in a direction which will cause the lever 96 to raise the plunger 93 and simultaneously raise the valve stem 91, allowing molten pitch to flow down on the effective molding surface of the block. The hand grip 100 is then released, whereupon the resilient means 95 will move valve 91 downwardly and close the opening 90. It is to be understood that the block 82 and lens blank 37 have been preheated on the shelves 114 and 115. The hand grip 106 is then grasped and rotated to move the latch member 101 outwardly of the locating slot 102 and the head of the device is then moved sidewise to a position wherein the latch member 101 will engage with the slot 103. When in this position the pitch kettle 87 is moved out of alignment with the lens block 82 and the blank 37 is simultaneously moved into alignment with said block 82. The clamp screw 76 is then loosened and the blank 37 and associated mechanism are manually guided downwardly toward the block 82 until the lens is intimately pressed into contact with the molten pitch. The blank 37 when in this position is constantly urged toward the pitch by the resilient means 39 so that shrinkage due to the cooling of the pitch is compensated for. When the pitch has cooled sufficiently to secure the lens blank to the block, the clamp screws 53 are loosened, whereupon the spring fingers 54 may be moved outwardly through operation of the handle 61. The fingers 54 and associated mechanism are then lifted in the housing 40 and the clamp screw 76 is tightened to hold them in this position. When in this position the head may be swung sidewise without danger of having the fingers engage and dislocate the lens from the block.

Referring to Figs. XI and XII, positioning and locking means is provided for the arm 41 so that in order to move the support 40 from the lens positional element aligning position to the blocking position or vice versa, the operator is forced to lift the finger and contact assembly up to an out of the way position. This obviates the possibility of a careless operator swinging the arm without first lifting the lens gripping and contact assembly and consequently bending, breaking or otherwise damaging the lens holding fingers, the lens, or other parts of the assembly.

This safety device comprises a pin member 122 longitudinally slidably supported in a sleeve 123 which is threadedly or otherwise attached, as at 124, to the base of the bracket 41 and therefore moves with the bracket when it is swung about the hub 77.

The bearing plate 125 beneath the bracket sleeve 126 is provided with recesses 127 and 128 into which the reduced end 129 of the locating pin 122 is adapted to drop. These openings are positioned so that when the pin 122 is in one, the bracket 41 is in lens aligning position, and when in the other the bracket is in lens blocking position. The pin 122 may be lifted out of the recess and thus release the bracket 41 for swinging movement about the hub 77 by the action of a lever system enclosed in the bracket 41. When one end of said system is moved by the lens finger assembly the pin 122 is lifted up before swinging the bracket 41. That is, the shoulder 130 of the assembly comes in contact with, and moves upwardly the end 131 of the bell crank lever 132. This lever 132 is pivoted in the bracket 41 at 133 and its angled foot 134 has attached thereto a link member 135 which is also pivotally attached to another bell crank lever 136, which is pivotally attached to the bracket 41, at 138, the said link 135 thus connecting the two bell crank levers 134 and 136. These levers 134 and 136 are also resiliently connected by a spring member 137 attached to one end 139 of the lever 136 and the pivot 133 of the lever 132 whereby the lever 136 is constantly urged about its pivot 138. The lever 136 has a yoke portion 140, at the end opposite the spring attachment 139, which is adapted to fit about the upper end of the pin 122. This yoke 140 is adapted to actuate the pin 122 longitudinally of the sleeve 123 by means of the engagement of a transverse pin 141 in the pin 122, with slots 142 in the yoke 140.

The action of the lever system is, then as follows—the contact end 131 of the lever 132 is pushed upwardly by the shoulder 130 when the lens finger assembly is raised prior to swinging the bracket 41. Lever 132 is thus moved about its pivot 133 and acts through the link 135 to pivot the lever 136 about its pivot 138 acting against the spring 137, and causing the yoke 140, and consequently the pin 122, to rise and remove the lower end 129 thereof from the recess 127 or 128, thus obviating the pin's locking action and allowing the bracket 41 to swing freely about its hub 77. It is to be understood that the lens finger assembly is held in desired up or down position, as explained previously, by the action of the locking screw 76. When the lens finger assembly is not contacting the lever 132, the spring 137 constantly, through the lever system, urges the pin 122 downwardly.

It will be noted by reference to Fig. IV that an additional pair of openings 121 are provided in which the ball members 34 may be located if desired. The purpose of providing these additional openings 121 is to enable the blocking of lenses which do not have a continuous surface thereon, such as, for example, Ultex bifocals wherein the segment portion of the bifocal is in a different curvature than the adjacent surface on the blank. By placing the contact balls 34 in the openings 121, all of the balls may be made to engage the adjacent surface of the blank and clearance is provided for the segment portion.

The inside of the upright 2 is illuminated so that light passes upward through the translucent member 32 and illuminates the lens 37. This illumination is supplied by a source 143, Fig. I, extending within the upright 2 and supported by a bracket 144 which is fixed to the base 1. The light is controlled by a suitable switch 145, and may be positioned out of alignment with the opening 26 and the translucent member 32 for the purpose of providing diffused light, or may be directly in alignment in order to provide the greatest possible illumination on the lens 37. If desired, suitable means 144a may be provided for moving the source into and out of alignment.

From the foregoing description it will be seen that simple, efficient and economical means have been provided for accomplishing the objects and advantages of the invention.

Having described my invention I claim:

1. In a device of the character described, comprising a base including spaced supports, one of said supports having an adjustable portion on which a lens is adapted to be rested, and the other having means for supporting a lens block, a head pivoted to said base, having a holding device alignable with the support on which the blank is rested and having an adhesive supply tank with delivery means alignable with the support having the lens block thereon, said adjustable portion being adapted to shift the position of the blank supported thereby and the said holding means having depending spring fingers for adjustably and resiliently gripping said blank at spaced portions on the edge thereof and central pin members adapted to resiliently contact a face of the blank so as to urge said blank in a direction longitudinally of said holding means, said holding means being adapted to grip a blank of either concave or convex curvature and at any angled position within the limits of its gripping fingers so as to retain the position to which the blank is shifted by said adjustable portion, whereby a predetermined amount of adhesive may be deposited on the lens block from said adhesive supply tank and the blank retained by said holding means swung into alignment with said lens block and into engagement with the adhesive, while retained in adjusted position by said holding means.

2. In a device of the character described, the combination of a base and head pivoted to said base, said base including spaced uprights, one of which embodies an adjustable portion for supporting a lens blank to be blocked and the other having means for supporting a lens block thereon, said head having holding means supported thereby for movement into and out of alignment with the respective uprights, said adjustable portion being adapted to shift the position of the lens blank supported thereby to given selected locations, and said holding means having depending spring fingers for adjustably and resiliently gripping said blank at spaced portions on the edge thereof and central pin members adapted to resiliently contact a face of the blank so as to urge said blank in a direction longitudinally of said holding means, said holding means being adapted to grip a blank of either concave or convex curvature and at any angled position within the limits of its gripping fingers so as to retain the position to which the blank is shifted by said adjustable portion, whereby the said holding means and lens blank may be moved into alignment with the lens block and be secured to said block while held in said location.

3. In a device of the character described, the combination of a base having spaced uprights thereon and a head pivoted thereto about an axis substantially parallel with the axes of said uprights, one of said uprights having an adjustable portion for supporting a lens blank and being adjustable to vary the position of set of said lens blank thereon, the other of said uprights having means for supporting a lens block, said head having an adhesive supply tank thereon alignable with the means for supporting the lens block and also having holding means alignable with the lens blank support, said holding means having means for engaging a side surface of the blank and means for gripping the edge of said blank while on said adjustable portion, means for locking said holding means in fixed position while in engagement with the side surface of said blank and for locking the holding means in gripping relation with the edge of said blank to retain the blank in located position, said adhesive supply tank having means operable to allow a predetermined amount of adhesive to flow on to the lens block supported by said lens block supporting means and said holding member and lens blank retained thereby being movable into alignment with said lens block and into engagement with the adhesive on said block while retaining the located position of said lens blank to secure said lens blank to said block in said located position.

4. In a device of the character described, the combination of a base having spaced uprights thereon and a head pivoted thereto about an axis substantially parallel with the axes of said uprights, one of said uprights having an adjustable portion for supporting a lens blank and being adjustable to vary the position of set of said lens blank thereon, the other of said uprights having means for supporting a lens block, said head having an adhesive supply tank thereon alignable with the means for supporting the lens block and also having holding means alignable with the lens blank support, said holding means having means for engaging a side surface of the blank and means for gripping the edge of said blank while on said adjustable portion, means for locking said holding means in fixed position while in engagement with the side surface of said blank and for locking the holding means in gripping relation with the edge of said blank to retain the blank in located position, said adhesive supply tank having means operable to allow a predetermined amount of adhesive to flow on to the lens block supported by said lens block supporting means and said holding member and lens blank retained thereby being movable into alignment with said lens block and into engagement with the adhesive on said block while retaining the located position of said lens blank to secure said lens blank to said block in said located position, and means correlated with said head and base for positively retaining said holding means in alignment with said respective uprights.

5. In a device of the character described, the combination of a base having spaced uprights thereon and a head pivoted thereto about an axis substantially parallel with the axes of said uprights, one of said uprights having an adjustable portion for supporting a lens blank and being adjustable to vary the position of set of said lens blank thereon, the other of said uprights having means for supporting a lens block, said head having an adhesive supply tank thereon alignable with the means for supporting the lens block and also having holding means alignable with the lens blank support, said holding means having means for engaging a side surface of the blank and means for gripping the edge of said blank while on said adjustable portion, means for locking said side surface engaging means in fixed position while in engagement with the side surface of said blank and for locking the said gripping means in gripping relation with the edge of said blank to retain the blank in located position, said adhesive supply tank having means operable to allow a predetermined amount of adhesive to flow on to the lens block supported by said lens block supporting means and said holding member and lens blank retained thereby being movable into alignment with said lens block and into engagement with the adhesive on said block while retaining the located position of said lens blank to secure said lens blank to said block in said located position, and means correlated with said head and base for positively retaining said holding means in alignment with said respective uprights, said holding means and the upright having the adjustable lens blank supporting portion thereon, having aligned sighting means therein by which the center of the lens blank may be located in desired position on said adjustable supporting portion.

6. In a device of the character described, the combination of a base having spaced supports thereon, one of said supports having an adjustable portion on which a lens blank is adapted to be rested, and the other having means for supporting a lens block, said adjustable portion having spaced contacts on which the blank is adapted to be rested, and being adjustable to locate the blank in a predetermined position, a head pivoted to said base about an axis substantially parallel with the axes of the supports, said head having an adhesive container alignable with a lens block on said lens block support and having valve means which may be opened to allow a given amount of adhesive to flow from said container and which may thereafter be closed, a holding member supported by said head and alignable with the lens blank support, said holding member having spring pressed means movable into engagement with a side surface of said blank when in located position and having gripping fingers adapted to engage and grip the edge of the blank, means for locking said spring pressed means in said engaged relation with said blank and for locking said fingers in gripping relation with the edge of said blank, said holding member being movable bodily with said blank in a direction away from the adjustable supporting portion and into alignment with the lens block support whereby the said blank may be moved into engagement with the adhesive on said block while retained in said located position and be secured to said block in said position.

7. In a device of the character described, the combination of a base having spaced supports thereon, one of said supports having an adjustable portion on which a lens blank is adapted to be rested, and the other having means for supporting a lens block, said adjustable portion having spaced contacts on which the blank is adapted to be rested, and being adjustable to locate the blank in a predetermined position, a head pivoted to said base about an axis substantially parallel with the axes of the supports, said head having an adhesive container alignable with a lens block on said lens block support and having valve means which may be opened to allow a given amount of adhesive to flow from said container and which may thereafter be closed, a holding member supported by said head and alignable with the lens blank support, said holding member having spring pressed means movable into engagement with a side surface of said blank when in located position and having gripping fingers adapted to engage and grip the edge of the blank, means for locking said spring pressed means in said engaged relation with said blank and for locking said fingers in gripping relation with the edge of said blank, said holding member being movable bodily with said blank in a direction away from the adjustable supporting portion and into alignment with the lens block support whereby the said blank may be moved into engagement with the adhesive on said block while retained in said located position and be secured to said block in said position, means for positively locating said holding member and adhesive container in alignment with the respective supports when the head is in one position of adjustment and for retaining said holding member in positive alignment with the block in another position of adjustment.

8. In a device of the character described, a lens block on which a lens blank is adapted to be secured, said block being adapted to receive a molten adhesive and having a resilient ring-like member having tongue-like portions thereon surrounding the surface of the block which is to receive the adhesive, for preventing the flow of said adhesive to portions of the face of said blank so as to provide cleared portions adapted to aid in the removal of the blank from the adhesive and for controlling the contour shape thereof.

9. A device for holding articles of the character of lenses comprising a plurality of separately adjustable depending spring fingers for resiliently gripping said article at spaced portions on the edge thereof so as to provide variable resilience at each of said spaced portions and central pin members adapted to resiliently contact a face of the article so as to urge said article in a direction longitudinally of said device, said device being adapted to grip an article of either concave or convex curvature and at any angled position within the limits of the said fingers so as to maintain said angled position.

LLOYD W. GODDU.